United States Patent [19]

Mueller et al.

[11] Patent Number: 5,508,258

[45] Date of Patent: Apr. 16, 1996

[54] USE OF SURFACE-ACTIVE ALPHA-SULFO-FATTY ACID DI-SALTS IN WATER AND OIL BASED DRILLING FLUIDS AND OTHER DRILL-HOLE TREATMENT AGENTS

[75] Inventors: Heinz Mueller, Monheim; Claus-Peter Herold, Mettmann; Johann F. Fues, Grevenbroich, all of Germany

[73] Assignee: Henkel Kommanditgesellschaft auf Aktien, Duesseldorf, Germany

[21] Appl. No.: 430,703

[22] Filed: Apr. 28, 1995

Related U.S. Application Data

[63] Continuation of Ser. No. 983,543, Feb. 3, 1993, abandoned.

[30]   Foreign Application Priority Data

Aug. 3, 1990 [DE] Germany .......................... 40 24 659.0

[51] Int. Cl.$^6$ ................................ C09K 7/02; C09K 7/00
[52] U.S. Cl. .......................................... 507/135; 507/905
[58] Field of Search ..................... 507/135, 905

[56]   References Cited

U.S. PATENT DOCUMENTS

| | | | |
|---|---|---|---|
| 1,926,442 | 9/1933 | Guenther et al. | 260/112 |
| 3,575,883 | 4/1971 | Foley | 507/135 |
| 3,642,623 | 2/1972 | Bennett et al. | 507/135 |
| 4,374,737 | 2/1983 | Larson et al. | 507/905 |
| 4,631,136 | 12/1986 | Jones, III | 507/905 |
| 4,787,990 | 11/1988 | Boyd | 507/905 |
| 4,839,096 | 6/1989 | Dennis et al. | 507/905 |
| 4,876,017 | 10/1989 | Trahau et al. | 507/905 |
| 5,106,516 | 4/1992 | Mueller . | |
| 5,194,422 | 3/1993 | Mueller . | |

FOREIGN PATENT DOCUMENTS

| | | |
|---|---|---|
| 0070190 | 12/1983 | European Pat. Off. . |
| 0070191 | 12/1985 | European Pat. Off. . |
| 0302402 | 2/1989 | European Pat. Off. . |
| 0302403 | 2/1989 | European Pat. Off. . |
| 3842703 | 6/1990 | Germany . |
| 3842659 | 6/1990 | Germany . |
| 3903785 | 8/1990 | Germany . |
| 3903784 | 8/1990 | Germany . |
| 3907392 | 9/1990 | Germany . |
| 3907391 | 9/1990 | Germany . |
| 3911299 | 10/1990 | Germany . |
| 3911238 | 10/1990 | Germany . |
| 3916550 | 11/1990 | Germany . |
| 3915875 | 11/1990 | Germany . |
| 3915876 | 11/1990 | Germany . |
| 4003028 | 8/1991 | Germany . |
| 4018228 | 12/1991 | Germany . |
| 4019266 | 1/1992 | Germany . |
| 4024658 | 4/1992 | Germany . |
| 1338935 | 11/1973 | United Kingdom . |

OTHER PUBLICATIONS

G. R. Gray, H. C. H. Darfley, "Composition and Properties of Oil Well Drilling Fluids", 4th ed., Gulf Publishing Co., 1981, pp. 51, 64, 320 et seg.
A. J. Stirton, "alpha–sulfo Fatty Acids and Derivatives, Synthesis, Properties and Use, in J. Am. Oil Chem. Soc." 1962, vol. 39, pp. 490–496.
"Petroleum Engineer International", Sep. 1987, pp. 32–40.
"World Oil", Nov. 1983, pp. 93–97.
Bourgoyne et al., "Applied Drilling Engineering", 1986, pp. 75–81.
Stein & Baumann, "alpha–sulfonated Fatty Acids and Esters: Manufacturing Process, Properties, and Applications", J. Am. Oil Chem. Soc. 1975, 52, pp. 323–329.

*Primary Examiner*—Philip Tucker
*Attorney, Agent, or Firm*—Ernest G. Szoke; Wayne C. Jaeschke; Real J. Grandmaison

[57]   ABSTRACT

Described is the use of surface-active alpha-sulfofatty acid di-salts as ecologically compatible emulsifiers of the W/O type and O/W type, respectively, in fluid and pumpable drilling fluids and other fluid drilling-hole treatment agents which comprise a continuous or a dispersed oil phase together with an aqueous phase and which are suitable for an environmentally acceptable exploitation of geological resources, for example oil or natural gas deposits. The invention further relates to inverted drilling fluids based on a continuous oil phase and, present therein, a dispersed aqueous phase which, in addition to the emulsifiers, contain further conventional auxiliary agents such as thickeners, fluid-loss additives, weighting agents, water-soluble salts and/or alkali reserves. The inverted drilling fluids according to the invention are characterized in that they contain surface-active di-salts of the type indicated as emulsifier or as an emulsifier component together with an ecologically compatible continuous oil phase.

22 Claims, No Drawings

USE OF SURFACE-ACTIVE ALPHA-SULFO-FATTY ACID DI-SALTS IN WATER AND OIL BASED DRILLING FLUIDS AND OTHER DRILL-HOLE TREATMENT AGENTS

This application is a continuation of application Ser. No. 07/983,543 filed on Feb. 3, 1993, now abandoned.

BACKGROUND OF THE INVENTION

1. Field of the Invention

The invention relates to the use of selected emulsifiers having an increased ecological compatibility for the production of fluid dispersed systems which are present either as W/O inverted emulsions comprising a continuous oil phase or as aqueous emulsions containing a dispersed oil phase and which are suitable for the technical application within the field of use of fluid drill-hole treatment agents. Referring to a characteristic example for agents of this kind, the invention is described hereinbelow by way of oil-based and water-based drilling fluids, respectively, and drilling muds formed therewith. However, the field of application of the modification according to the invention of auxiliary liquids of the kind involved here is not limited thereto, while it also includes in particular the areas of spotting fluids, spacers, auxiliary liquids for workover and stimulation and for fracturing.

It is one particular object of the invention to substantially influence the ecological compatibilty of said auxiliary agents which are being worldwide used today by employing selected and, more specifically, ecologically acceptable types of emulsifiers. In its preferred embodiment the invention intends to use said biologically acceptable emulsifiers simultaneously in combination with oil phases having an increased environmental compatibility and especially a biological degradability.

2. Discussion of Related Art

In the area of liquid sweeping systems for rock-drilling to bring-up the removed drill cuttings, the so-called inverted drilling muds are of excellent importance which, based on W/O emulsions, contain a dispersed aqueous phase in the continuous phase. The content of the dispersed aqueous phase usually is within the range of from about 5 to 50% by weight.

However, also known are water-based drilling fluids comprising an emulsified dispersed oil phase (O/W type), the oil content of which may range from some percent to about 50% by weight. O/W emulsion fluids of this kind exhibit a number of considerable advantages over merely water-based fluid systems.

The stabilization of each of the selected dispersion forms requires the use of appropriate emulsifiers either of the W/O type (inverted fluids) or of the 0/W type (emulsion fluids), respectively. Hereto, reference is made to the pertinent literature, for example, G. R. Gray, H. C. H. Darley, "Composition and Properties of Oil Well Drilling Fluids" 4th Edition, Gulf Publishing Cp., Houston, London 1981, especially pages 51, 64 and 320 et seq.

Today the oil phases of drilling fluids of the type described here and comparably composed other drill-hole treatment agents in practice are almost exclusively formed by mineral oil fractions. This involves a considerable environmental pollution, if, for example, the drilling muds directly or via the drilled rock will infiltrate the environment. Mineral oils are only difficult to decompose and are virtually not anerobically degradable at all and, thus, to be rated as long-term pollutants. Nevertheless, even if these oil phases as the main constituent or at least a substantial portion of the drilling fluid make a significant starting point for ecological considerations, an equivalent attention will have to be paid also to the other components of such multi-component systems. Here, the emulsifiers are of specific importance. Compounds of this type, in accordance with the intended use thereof, are highly active substances already at a low concentration which are known to be capable of an intense interaction with the vegetable or animal organism.

OBJECT OF THE INVENTION

It is the object of the present invention to substanially improve the working agents of the described type based on continuous or dispersed oil phases in admixture with aqueous phases, in appreciation of the ecological compatability thereof, over the working agents of this kind as common to-day. More specifically, it is the object of the invention, for the field of use as involved here, to provide emulsifiers and/or emulsifier combinations which have been per se known and have been described to be environmentally compatible to a high degree, while they have not been put into use in the field of use involved here. In the preferred embodiment of the invention, these environmentally compatible emulsifiers of the W/O type or of the O/W type are to be employed in combination with oil/water phases, where the oil phases themselves have an increased ecological compatibility and, more specifically, are capable of being decomposed by natural degradation mechanisms doing little harm to the environment.

DESCRIPTION OF THE INVENTION

Other than in the operating examples, or where otherwise indicated, all numbers expressing quantities of ingredients or reaction conditions used herein are to be understood as modified in all instances by the term "about".

The invention, in order to attain the first partial object thereof, provides the use of per se known surface-active alpha-sulfo-fatty acid di-salts as ecologically compatible or acceptable compounds which, depending on their constitution and kind of interaction with the surrounding system are to be classified as W/O emulsifiers or as O/W emulsifiers. For the sake of simplicity, said emulsifiers are briefly called "di-salts" hereinbelow.

Thus, in a first embodiment, the invention relates to the use of surface-active di-salts of the W/O type and/or O/W type, as ecologically compatible emulsifiers, in fluid and pumpable drilling fluids and other fluid drilling-hole treatment agents which comprise a continuous or a dispersed oil phase together with an aqueous phase and which are suitable for an environmentally acceptable exploitation of geological resources, for example oil or natural gas deposits.

Of particular importance in this context are the corresponding inverted drilling fluids which in a continuous oil phase contain a dispersed aqueous phase together with emulsifiers and further conventional auxiliary agents such as thickeners, fluid-loss additives, weighting agents, soluble salts and/or alkali reserve. In this embodiment according to the invention there is provided the use of surface-active di-salts of the W/O type as emulsifier or at least as a component of an ecologically compatible emulsifier system.

Preferred is the use of emulsifiers based on surface-active di-salts in combination with environmentally compatible ester oils, oleophilic alcohols and/or corresponding ethers as continuous or dispersed oil phase. Here particular reference is to be made to pertinent developments by applicant describing, in a greater number older patent applications, proposals for substituting the previously common mineral oil fractions with ecologically compatible readily degradable oil phases. Thereby, various types of substituting oils have been presented which may also be used as mixtures. They include selected oleophilic monocarboxylic acid esters, selected polycarboxylic acid esters, at least largely water-insoluble alcohols which are fluid under the operation conditions, corresponding ethers and selected carbonic acid esters. In summary, reference is made here to the older applications P 38 42 659.5 U.S. Pat. No. 5,232,970, P 38 42 703.6 U.S. Pat. No. 5,252,554, P 39 07 391.2 U.S. Pat. No. 5,318,954, P 39 07 392.0 U.S. Ser. No. 07/752,672, (which has been allowed but not accorded a Pat. No. pending payment of issue fee), P 39 03 785.1 U.S. Pat. No. 5,254,531, P 39 03 784.3 U.S. Pat. No. 5,106,516, P 39 11 238.1 U.S. Pat. No. 5,348,938, P 39 11 299.3 U.S. Pat. No. 5,318,955, P 40 18 228.2 (D 9167) and P 40 19 266.0 (D 9185). All of the older applications mentioned here relate to the field of oil-based drilling fluid systems, especially of the W/O inverted type. Water-based emulsion fluids using these oil phases of an increased degradability have been described in the older German applications P 39 15 876.4 U.S. Pat. No. 5,318,956, P 39 15 875.6 U.S. Pat. No. 5,194,422, P 39 16 550.7 (U.S. Ser. No. 07/777,376) (pending) and the applications P 40 18 228.2 (D 9167) and P 40 19 266.0 (D 9185) as already mentioned.

The invention, in its most important embodiment, comprises the use, in combination, of the above-described emulsifiers of the class of the surface-active di-salts together with dispersed or continuous oil phases of the type described last. The disclosure of said older applications is hereby explicitly incorporated by reference.

DETAILS OF THE TEACHING ACCORDING TO THE INVENTION

Surface-active di-salts and the preparation thereof have been described in detail in the state of prior art, while emphasis so far has been laid on the use thereof as O/W emulsifiers—for example in the context of detergents and cleansers. In this context, reference is made to the publication by Stein and Baumann, "alpha-Sulfonated Fatty Acids and Esters: Manufacturing Process, Properties and Applications", J. Am. Oil Chem. Soc. 1975, 52, 323–329, and the primary literature quoted therein. Already here the good eco-toxicological properties of alpha-di-salt have been mentioned, while the high bio-degradability, the low acute oral toxicity and the good compatibility to the skin have been particularly highlighted. From the more recent literature dealing with this class of compounds there may be noted the EP-A2-0 302 402 and 0 302 403 wherein indications are found on the acute aquatic toxicity of the sodium-di-salts as determined with orfes and daphniae. In said latter publications the di-salts are recommended for the in detergents and cleansers having an improved eco-compatibility for laundering textile fabrics. From the extensive printed literature of prior art for producing such di-salts there may be chosen the U.S. Pat. No. 1,926,442, the paper by A. J. Stirton "alpha-Sulfo Fatty Acids and Derivatives, Synthesis, Properties and Use" in J Am Oil Chem Soc 1962, 39, 490–496 and the literature quoted therein. Further known is especially the sulfonation of fatty acids with a sub-stoichiometric amount of the sulfonating agent—usually based on $SO_3$—whereupon mixtures of di-salt and soap are obtained; hereto cf., for example, the British Patent Specification No. 1,338,935.

Furthermore, it has been known that there are differences in the solubilities of such di-salts between the monovalent cations, and especially soaps formed with alkali metal salts, on the one hand, and the soaps formed with polyvalent cations, of which here the alkaline earth metals and/or aluminum, and above all calcium, are especially considered as the cationic salt-forming entity. The di-salts of such polyvalent cations are sparingly soluble if compared to the sodium di-salts. Upon the addition of calcium ions and also of magnesium ions to an aqueous solution of the sodium di-salts, the corresponding di-salts of the alkaline earth metals will be precipitated. This known precipitation reaction is utilized, for example, in the field of textile washing and textile agents, where soluble di-salt compounds are employed as builder components for sequestering the calcium ions from the wash liquor; hereto cf., e.g., EP-B1-0 070 190 and 0 070 191.

None of said prior art proposals provides an indication or suggestion of the particular suitability of alpha-sulfofatty acid di-salts in the soluble embodiments thereof (especially as the alkali di-salts) as well as just in the comparably insoluble embodiments thereof (di-salts of polyvalent ions, and especially of calcium and/or magnesium) as O/W emulsifiers and as W/O emulsifiers, respectively, in mixed phases containing water and oil of the type involved here and of the intended use involved here. This is all the more surprising in view of the knowledge as per se known of employing corresponding non-sulfonated fatty acid soaps—for example the corresponding sodium soaps of the comparably sparingly soluble calcium soaps of higher fatty acids—as emulsifiers or emulsifier components in, for example, drilling fluid systems.

As has been indicated, the invention purposefully makes use of these per se known soluble or sparingly soluble salts of alpha-sulfofatty acids (di-salts) and thereby enables a lasting stabilization of oil-based W/O inverted emulsions with an absence of the to-day widely conventional N-containing emulsifier systems, the compatibility of which is not undisputed, particularly so in the especially sensitive marine eco-system.

The di-salts as now to be used for the intended use according to the invention may be characterized by the following general formula (I)

$$R\text{—}CH(SO_3M)\text{—}CO_2M \qquad (I)$$

wherein

R in said formula represents linear and/or branched alkyl which may be saturated and/or olefinically unsaturated while, however, it is preferably at least predominantly saturated, and has at least 4 carbon atoms in the moiety R. Preferred are corresponding moieties R having from 6 to 22 carbon atoms.

M represents the same or different cations selected from the group of alkali metal, alkaline earth metal (M/2) and/or aluminum (M/3) .

Suitable as the feedstock for the production of the surface-active di-salts are natural and/or synthetic fatty acids which have a linear structure and/or are branched. Here the corresponding fatty acids of natural origin are of particular importance because of the easy accessability thereof, said acids in general comprising mixtures of homologous acids within a given range of carbon atom numbers which is determined by the respective feedstock. The carboxylic acids or mixtures of carboxylic acids to be subjected to the a-sulfonation conveniently are at least largely saturated in nature, although a use in combination of unsaturated components will not be excluded. Then in these unsaturated portions there regularly occurs also a sulfonation at positions in the chain.

Of particular practical importance are alpha-sulfonated carboxylic acids of a range comprising at least 6 carbon atoms (R=4 in the general formula (I)), with the range of fatty acids or fatty acid mixtures comprising from $C_8$ to $C_{24}$ having particular practical importance. Di-salts which at least in portions or preferably predominantly contain fatty acid moieties comprising 10 and more carbon atoms, and preferably at least 12 to 14 carbon atoms, are preferred starting materials for the emulsifier components to be used according to the invention. Fatty acid moieties comprising 16 to 18 carbon atoms, and more specifically the corresponding saturated alpha-sulfonated fatty acid salts, may have particular importance for technical as well as for economic reasons. Starting materials for the production of many monocarboxylic acids falling within these subclasses, and especially of those having higher numbers of carbon atoms, are vegetable and/or animal oils and/or fats, respectively, which are known, in the normal case, to be triglycerides of the acids or acid mixtures. As the feedstock for the production of fatty acids of natural origin there may be mentioned coconut oil, palm kernel oil and/or babassu oil as well as animal-derived fats and tallows, especially for the recovery of monocarboxylic acid of the prevailing range up to $C_{18}$ and then of essentially saturated components. Ester oils of vegetable origin based on olefinically mono- and optionally poly-unsaturated carboxylic acids of the range of $C_{16-24}$ are, for example, palm kernel oil, peanut oil, castor oil, sunflower oil, and especially rapeseed oil. Fatty acids of this kind, for a selective alpha-sulfonation, usually require first to be hydrogenated. But also straight-chain and/or branched carboxylic acids produced by a synthetic route, which are producible by oxidation from primarily recovered synthetic alcohols of the type of oxoalcohols and/or Ziegler alcohols are suitable components for the production of the di-salts and, hence, for the use thereof within the scope of the inventive action as emulsifier for, especially, drilling fluids.

Di-salts of the kind concerned by the invention, when synthesized in a procedure of practice are obtained, as a rule, in the form of the alkali metal salts and, more particularly, in the form of the di-sodium salts. The di-salts, which are especially important according to the invention, of polyvalent cations, and more specifically the corresponding alkaline earth metal di-salts, may be recovered from the free acid and/or by way of the per se known reaction of the sodium salts with appropriate alkaline earth metal salts, especially with soluble alkaline earth metal salts. It is possible to produce the respective di-salts in a separate reaction and to employ them as preformed sparingly soluble di-salts, for example in the drilling mud. However, it has proven to be particularly advantageous to utilize the possibility of an in situ formation of such di-salts of polyvalent cations. This may be illustrated by way of the following example:

The aqueous dispersed phase in oil-based drilling fluids of the inverted type is generally loaded with dissolved salts, especially calcium salts such as calcium chloride, in practical use. If such aqueous phases containing dissolved alkaline earth metal salts are used in forming the inverted emulsion, then the corresponding alkaline earth metal salts of the alpha-sulfonated fatty acids will be formed even if said emulsifier components are initially employed in the form of their sodium salts. Not only does this allow a particularly economical realization of the teaching according to the invention, but it has also been shown that rheologically highly stable inverted emulsions are accessible by such an in situ formation of the alkaline earth metal salts which are especially active as W/O emulsifiers. It will be right apparent in the case of such a salt-exchange reaction that also the potassium di-salts may have particularly importance as feedstcok material: In the reaction with the meaning as described last, there is formed potassium chloride besides the calcium di-salts that are active as W/O emulsifiers, which potassium chloride transits in the aqueous dispersed phase and here is a known preferred constituent for the inhibition of water-swellable clays within the exploitation of geological resources.

The di-salt-base emulsifiers, in a preferred embodiment, are employed as the essential components forming the type of emulsion and stabilizing the emulsion. Nevertheless the teaching according to the invention also includes mixed systems in which di-salts are used together with other emulsifier components. It is preferred that these other emulsifier components on their own are ecologically compatible; in this context reference may be made to Applicant's older application P 40 03 028.8 (U.S. Ser. No. 07/916,092) (abandoned) wherein selected ether-based emulsifiers for oil-based inverted emulsions have been described. Another example for suitable co-emulsifiers is provided by the surface-active alkyl glycoside co-pounds described in the parallel pending German Patent Application P 40 24 658.2 (D 9223).

Salts—and more specifically corresponding salts—of fatty acids of natural and/or synthetic orgin can be especially suitable co-emulsifiers. In an economic manner the respective emulsifier mixtures will be obtained, for example in accordance with the British Patent Specification No. 1,338, 935 as initially quoted, by only a partial reaction of the fatty acid starting material to form the alpha-sulfonated reaction product. However, the invention also includes admixing any optional fatty acids or fatty acid salts as co-emulsifiers to the respective compositions of active ingredients, in which case, more specifically, it has been shown that no problems are caused by a use, in combination, of unsaturated straight-chain and/or branched fatty acids.

If such emulsifier mixtures are used, then in preferred embodiments of the invention the di-salts constitute at least 10% by weight, and preferably at least 50% by weight, of the respective emulsifier system.

The di-salts may be used in amounts of from about 0.1 to 10% by weight, relative to the sum of the liquid phases water and oil. Preferred amounts are within the range of from about 0.5 to 5% by weight of the emulsifier components, while the range of from about i to 3% by weight of the emulsifier—again relative to the sum of water+oil—is of particular importance.

The economical production of the emulsifiers according to the invention is significantly facilitated by omitting the step of bleaching the reaction products as primarily obtained, which step in prior art as evidenced by the pertinent printed publications is considered as an essential process step. Thus, the production process for compositions of active substances containing di-salts within the scope of the invention may be restricted to the process steps of sulfonation and salt-formation. The crude reaction product may be directly put into a commercial use.

In the preferred embodiments as especially featured in the introduction, the appropriate oil phases are constituted by the ecologically compatible ester oils, oleophilic alcohols and/or ethers described in applicant's older applications as quoted. When said agents are used, the invention relates to the drill-hole treatment agents which are fluid and pumpable within the temperature range of from 5° C. to 20° C., and more specifically drilling fluids based on either a continuous oil phase, especially in admixture with a dispersed aqueous phase (W/O inverted type)

or a dispersed oil phase in a continuous aqueous phase (O/W emulsion type).

The ecologically compatible oils and oil phases, with respect to the possible physical properties thereof, covers a wide range. The invention comprises, on the one hand, oil phases which are fluid and pumpable also at low temperatures. These, more particularly, include representatives suitable for the preparation of W/O emulsions. However, on the other hand, highly viscous to solid oil phases and materials of this type may also be included in the use within the scope of the teaching according to the invention. This may be exemplified by the following deliberations:

For water-based O/W emulsion fluids a high mobility of the dispersed oil phase is not required and, as the case may be, not even desirable. For example, to ensure good lubricating properties, oil phases adjusted such as to be comparably viscous may be advantageous. Another possible use of highly viscous or even solid ecologically compatible oil phases may be constituted, if the respective oil phase involved in the final product is only partially formed by said highly viscous to solid representatives of degradable esters, alcohols and/or ethers which themselves have been admixed with comparably highly liquid oils of this kind.

Nevertheless, there is consistently applicable to all oil phases or mixed oil phases to be used according to the invention that flash points of at least about 100° C. and preferably flash points of above about 135 ° C. are demanded for reasons of safety in operations. Values that are distinctly higher, particularly those above 150 ° C., may be especially expedient. Furthermore, there is consistently applicable to the oil phases as potentially susceptible to hydrolysis that may be used within the scope of the invention not only that the requirement of the ecological compatibility will have to be met by the compound put into use, i.e., for example, the respectively selected ester oil or ester oil mixture, but also that no toxicological and especially no inhalation-toxicological danger will be induced upon a partial saponification in practical use. Within the scope of the mentioned older applications there has been described in great detail that here, more particularly, the various representatives of ester oils are referred to, with the monofunctional alcohols from the esters formed being again of particular significance here. In comparison to polyfunctional alcohols, the lower members of the monofunctional alcohols are highly volatile, so that here a partial hydrolysis may cause exposure to secondary danger. Accordingly, in the classes of the various ester oils those monofunctional alcohols included in the use, or the moieties of such alcohols, have been chosen so that they have at least 6 carbon atoms, and preferably at least 8 carbon atoms, in the molecule thereof.

The inverted drilling fluids of the kind involved according to the invention, irrespectively of a definite property of the continuous oil phase, in preferred embodiments have a plastic viscosity (PV) within the range of from 10 to 60 mPa.s and a flow limit (yield point, YP) within the range of from 5 to 40 lb/100 ft²—each determined at 50 ° C.

As an oil phase which is ecologically compatible and well fluid at low temperature, there have proven to be useful, more specifically, ester oils of monocarboxylic acids which then, in a preferred embodiment of the invention, are derived from at least one of the following subclasses:

a) Esters of $Cl_{1-5}$-monocarboxylic acids and mono- and/or polyfunctional alcohols, whereof the moieties of monohydric alcohols comprise at least 6 carbon atoms and preferably at least 8 carbon atoms and the polyhydric alcohols preferably have from 2 to 6 carbon atoms in the molecule, b) Esters of monocarboxylic acids of synthetic and/or natural origin comprising from 6 to 16 carbon atoms, and more specifically esters of aliphatic saturated monocarboxylic acids and mono- and/or polyfunctional alcohols of the kind mentioned in a), c) Esters of olefinically mono- and/or polyunsaturated monocarboxylic acids having at least 16, and especially 16 to 24 carbon atoms and especially monofunctional straight-chain and/or branched alcohols.

Starting materials for recovering numerous monocarboxylic acids falling under these subclasses, especially those having a higher number of carbon atoms, are vegetable and/or animal oils. There may be mentioned coconut oil, palm kernel oil and/or babassu oil, especially as feedstock for the recovery of monocarboxylic acids of the prevailing range up to $C_{18}$ and of essentially saturated components. Ester oils of vegetable origin based on olefinically mono- and optionally poly-unsaturated carboxylic acids of the range of $C_{16-24}$ are, for example, palm kernel oil, peanut oil, castor oil, sunflower oil, and especially rapeseed oil. But also components synthetically recovered are important structural elements for ecologically compatible oil phases on the side of the carboxylic acids as well as on the side of the alcohols.

Additives to the oil-based and/or water-based fluid

Inverted drilling muds conventionally contain, together with the continuous oil phase, the finely dispersed aqueous phase in amounts of from 5 to 50% by weight. In water-based emulsion fluids the dispersed oil phase is usually present in amounts of from at least about 1 to 2% by weight, frequently in amounts of from at least about 5% by weight with an upper limit of the oil portion of about from 40 to 50% by weight—the percentage by weight in all cases being based on the sum of the unloaded liquid portions of oil/water.

Besides the water content, there are to be taken into consideration all of the additives provided for comparable types of fluids. Said additives may be water-soluble, oil-soluble and/or water-dispersible and/or oil-dispersible.

Conventional additives, besides the emulsifiers defined according to the invention, include, for example, fluid-loss additives, soluble and/or insoluble materials to build-up structural viscosity, alkali reserve, agents for inhibiting an undesirable water exchange between drilled formations—e.g. water-swellable clays and/or salt layers—and the, e.g., water-based drilling fluid, wetting agents for an improved strike of the emulsified oil phase on solid surfaces, e.g. for improving the lubricating effect, but also for improving the oleophilic closure of exposed rock formations, e.g. rock surfaces, biocides, for example for inhibiting bacterial onset and growth of O/W emulsions and the like. In detail, reference is here to be made to pertinent prior art such as described, for example, in the technical literature as initially quoted; cf., more specifically, Gray and Darley, loc. cit., Chapter 11, "Drilling Fluid Components" Just by way of an excerpt, there may be quoted:

Finely dispersed additives for increasing the density of the fluid: Widely used is barium sulfate (baryte), but also calcium carbonate (calcite) or the mixed carbonate of calcium and magnesium (dolomite) are used.

Agents for a build-up of structural viscosity which simultaneously will act as fluid-loss additives: Here, bentonite of hydrophobized bentonite are to be mentioned in the first place. For salt water fluids, other comparable clays, and more specifically attapulgite and sepiolite are of considerable importance in practice.

Also the use in combination of organic polymer compounds of natural and/or synthetic origin may be of considerable importance in this connection. There may be especially mentioned starch or chemically modified starches, cellulose derivatives such as carboxymethylcellulose, guar gum, xanthan gum, or also merely synthetic water-soluble and/or water-dispersible polymer compounds, especially of the type of the high molecular weight polyacryl amide components with or without anionic or cation modifications, respectively.

Diluents for regulating the viscosity: The so-called diluents (thinners) may be organic or inorganic in nature. Examples for organic thinners are tannin and/or quebracho extract. Further examples are lignite and lignite derivatives, especially lignosulfonates. However, as has been set forth hereinabove, in a preferred embodiment, just here no toxic compounds will be included in the use, among which in the first place the respective salts with toxic heavy metals such as chromium and copper are to be mentioned. Polyphosphate compounds constitute an example of inorganic thinners.

Additives inhibiting the undesirable water-exchange with, for example, clays: Here to be considered are the additives known from prior art for oil- and water-based drilling fluids. These include halides and/or carbonates of the alkali and/or alkaline earth metals, whereof the potassium salts, optionally in combination with lime, may be of particular importance.

Reference may be made, for example, to the relevant publications in "Petroleum Engineer International", September 1987, 32–40, and "World Oil" November 1983, 93–97.

Alkali reserves: Here to be taken into consideration are inorganic and/or organic bases adjusted to match the total behavior of the fluid, and more particularly basic salts or hydroxides of alkali and/or alkaline earth metals as well as organic bases. Kind and amount of these basic components will have been selected and mutually adjusted in a known manner so that the drilling hole treating agents will be adjusted to a pH value within the range of from about neutral to moderately basic, especially to the range of from about 7.5 to 11.

Basically, the amounts of each of the auxiliary materials and additives is within the conventional range and, thus, may be learnt from the relevant literature as quoted.

EXAMPLES

In the following Examples 1 and 2, by observation of a standard formulation for oil-based drilling fluid systems of the W/O type there are set forth appropriate drilling fluid systems, wherein each continuous oil phase is formed by a selected oleophilic carboxylic acid ester of the following definition:

An ester mixture comprising substantially saturated fatty acids based on palm kernel and 2-ethylhexanol which to the by far predominating part is derived from $C_{12/14}$-carboxylic acids and conforms to the following specification:

$C_8$: from 3.5 to 4.5% by weight
$C_{10}$: from 3.5 to 4.5% by weight
$C_{12}$: from 65 to 70% by weight
$C_{14}$: from 20 to 24% by weight
$C_{16}$: about 2% by weight
$C_{18}$: from 0.3 to 1% by weight The ester mixture is a bright yellow liquid which has a flash point in excess of 165° C. and a viscosity (Brookfield, 20° C.) of from 7 to 9 cP.

The viscosity characteristics are determined with unaged and aged material as follows:

Measurement of the viscosity at 50° C. in a Fann-35 viscosimeter from the company Baroid Drilling Fluids, Inc. In a per se known manner there have been determined the plastic viscosity (PV), the yield point (YP) and the gel strength (lb/100 ft$^2$) after 10 seconds and after 10 minutes. In Example 1 there is further determined the fluid loss value (HTHP).

Ageing of the respective drilling fluid is effected by way of a treatment at 125° C. in an autoclave—in a so-called roller oven—for 16 hours.

The drilling fluid systems are composed in a per se known manner in accordance with the following basic formulation:

230 ml of carboxylic acid ester oil 26 ml of water 6 g of organophilic bentonite (GELTONE from the company Baroid Drilling Fluids, Inc.)

12 g of organophilic lignite (DURATONE from the company Baroid Drilling Fluids, Inc.)

2 g of lime 6 g of emulsifier based on di-salt 3 g of co-emulsifier based on C fatty acid
—only used in Example 2—

346 g of baryte 9.2 g of CaCl$_2$. 2 H$_2$O

The emulsifier based on di-salt is introduced as a $C_{16-18}$-sulfofatty acid di-sodium salt, while in the pre-processing of the drilling fluid system upon the addition of calcium chloride it is converted into the corresponding calcium salt.

The characteristic values determined of the unaged and of the aged materials have been compiled in the following Tables relating to the Examples 1 and 2.

Example 1

|  | Unaged Material | Aged Material |
| --- | --- | --- |
| Plastic viscosity (PV) | 37 | 34 |
| Yield point (YP) | 19 | 19 |
| Gel strength (lb/100 ft$^2$) | | |
| 10 seconds | 10 | 12 |
| 10 minutes | 22 | 28 |
| HTHP 5 ml | | |

Example 2

|  | Unaged Material | Aged Material |
| --- | --- | --- |
| Plastic viscosity (PV) | 39 | 40 |
| Yield point (YP) | 17 | 13 |
| Gel strength (lb/100 ft$^2$) | | |
| 10 seconds | 10 | 7 |
| 10 minutes | 16 | 13 |

We claim:

1. An invert emulsion drilling fluid composition suitable for the environmentally-acceptable development of a geological resource, said composition consisting essentially of:

(a) a continuous oil phase selected from the group consisting of an ester oil, an oleophilic alcohol, an oleophilic ether, and a carbonic acid ester, (b) an aqueous phase dispersed in said oil phase, (c) a thickening agent, (d) a fluid-loss additive, (e) a weighting agent, (f) an alkali reserve component, and (g) an emulsifier consisting of a surface-active alpha-sulfofatty acid adi-salt.

2. A composition as in claim 1 wherein said di-salt has the structural formula I $$R-CH(SO_3M)-CO_2M \qquad (I)$$

wherein

R represents a linear or branched alkyl group having at least 4 carbon atoms, and M represents the same or different cation of an alkali metal, alkaline earth metal, or aluminum.

3. A composition as in claim 2 wherein M represents calcium or magnesium.

4. A composition as in claim 3 wherein R represents an alkyl group having at least 10 carbon atoms.

5. A composition as in claim 1 wherein said ester oil comprises an ester of a mono- or polycarboxylic acid and a mono- or polyfunctional alcohol.

6. A composition as in claim 1 having a plastic viscosity of from about 10 to about 60 mPa.s and a yield point of from about 5 to about 40 lbs/100 ft$^2$ each determined at about 50° C.

7. A composition as in claim 1 wherein said aqueous phase comprises from 5 to about 50% by weight of said composition, and contains CaCl$_2$ salts dissolved therein.

8. A composition as in claim 1 wherein said oil phase has a Brookfield viscosity of less than about 50 mPa.s measured at 0° C. to 5° C.

9. A water-based emulsion drilling fluid composition suitable for the environmentally-acceptable development of a geological resource, said composition consisting essentially of:

(a) a continuous aqueous phase, (b) an oil phase selected from the group consisting of an ester oil, an oleophilic alcohol, an oleophilic ether, and a carbonic acid ester dispersed in said aqueous phase, (c) a thickening agent, (d) a fluid-loss additive, (e) a weighting agent, (f) an alkali reserve component, and (g) an emulsifier consisting of a surface-active alpha-sulfofatty acid di-salt.

10. A composition as in claim 9 wherein said di-salt has the structural formula I $$R-CH(SO_3M)-CO_2M \qquad (I)$$

wherein

R represents a linear or branched alkyl group having at least 4 carbon atoms, and M represents the same or different cation of an alkali metal, alkaline earth metal, or aluminum.

11. A composition as in claim 10 wherein M represents sodium.

12. The process of developing a geological resource by drilling, comprising contacting said resource during drilling with a composition consisting essentially of;

(a) an aqueous phase, (b) an oil phase selected from the group consisting of an ester oil, an oleophilic alcohol, an oleophilic ether, and a carbonic acid ester, (c) a thickening agent, (d) a fluid-loss additive, (e) a weighting agent, (f) an alkali reserve component, and (g) an emulsifier consisting of a surface-active alpha-sulfofatty acid di-salt.

13. A process as in claim 12 wherein said di-salt has the structural formula I $$R-CH(SO_3M)-CO_2M \qquad (I)$$

wherein

R represents a linear or branched alkyl group having at least 4 carbon atoms, and M represents the same or different cation of an alkali metal, alkaline earth metal, or aluminum.

14. A process as in claim 13 wherein M represents sodium, calcium or magnesium.

15. A process as in claim 14 wherein R represents an alkyl group having at least 10 carbon atoms.

16. A process as in claim 12 wherein said ester oil comprises an ester of a mono- or polycarboxylic acid and a mono- or polyfunctional alcohol.

17. A process as in claim 12 wherein said composition has a plastic viscosity of from about 10 to about 60 mPa.s and a yield point of from about 5 to about 40 lbs/100 ft$^2$, each determined at about 50° C.

18. A process as in claim 12 wherein said aqueous phase comprises from about 5 to about 50% by weight of said composition, and contains CaCl$_2$ salts dissolved therein.

19. A process as in claim 12 wherein said oil phase has a Brookfield viscosity of less than about 50 mPa.s measured at 0° C. to 5° C.

20. A process as in claim 12 wherein said di-salt is present in the amount of from about 0.1 to about 10% by weight, based on the sum of said aqueous phase and said oil phase.

21. A process as in claim 12 wherein said oil phase has a flash point of at least about 100° C.

22. A process as in claim 12 wherein said oil phase comprises the continuous phase of said composition, and said oil phase is selected from the group consisting of a) an ester of a C$_1$–C$_5$ monocarboxylic acid and a mono- or polyfunctional alcohol wherein said monofunctional alcohol contains at least 6 carbon atoms and said polyfunctional alcohol contains from 2 to 6 carbon atoms in the molecule, b) an ester of a C$_6$–C$_{16}$ aliphatically saturated monocarboxylic acid and a mono- or polyfunctional alcohol as in a), and c) an ester of a mono- or polyolefinicelly unsaturated C$_{16}$–C$_{24}$ monocarboxylic acid and a monofunctional straight chain or branched alcohol.

* * * * *